(12) United States Patent
Kuo et al.

(10) Patent No.: US 12,254,138 B2
(45) Date of Patent: Mar. 18, 2025

(54) METHOD FOR CALIBRATING FUNCTIONAL ICON DISPLAY POSITION AND CONTROL DEVICE USING THE METHOD

(71) Applicant: Primax Electronics Ltd., Taipei (TW)

(72) Inventors: Wei-Ching Kuo, Taipei (TW); Xu Yang, Taipei (TW); I-Min Shu, Taipei (TW); Rong-Fu Lee, Taipei (TW)

(73) Assignee: Primax Electronics Ltd., Taipei (TW)

( * ) Notice: Subject to any disclaimer, the term of this patent is extended or adjusted under 35 U.S.C. 154(b) by 232 days.

(21) Appl. No.: 18/137,090

(22) Filed: Apr. 20, 2023

(65) Prior Publication Data

US 2024/0220029 A1 Jul. 4, 2024

(30) Foreign Application Priority Data

Dec. 30, 2022 (CN) .......................... 202211723477.3

(51) Int. Cl.
*G06F 3/02* (2006.01)
*G06T 7/73* (2017.01)
*G09G 3/36* (2006.01)

(52) U.S. Cl.
CPC .............. *G06F 3/0202* (2013.01); *G06T 7/74* (2017.01); *G09G 3/36* (2013.01); *G09G 2320/0693* (2013.01)

(58) Field of Classification Search
CPC .......... G06F 3/0202; G06T 7/74; G09G 3/36; G09G 2320/0693
See application file for complete search history.

(56) References Cited

U.S. PATENT DOCUMENTS

| | | | |
|---|---|---|---|
| 9,625,256 B1* | 4/2017 | Muthur Srinath ... | G01B 11/272 |
| 2011/0074739 A1* | 3/2011 | Kikin-Gil ............. | G06F 3/0488 |
| | | | 345/176 |
| 2016/0009177 A1* | 1/2016 | Brooks ................. | B60K 35/00 |
| | | | 340/468 |

* cited by examiner

*Primary Examiner* — Benjamin C Lee
*Assistant Examiner* — Nathan P Brittingham
(74) *Attorney, Agent, or Firm* — KIRTON McCONKIE; Evan R. Witt

(57) ABSTRACT

A method for calibrating a functional icon display position of a control device is provided. The control device includes a transparent key and a display panel. The method includes the following steps. Firstly, an image capturing device is used to photograph a functional icon, and thus a real spatial relationship of the functional icon in a visible region of the transparent key is obtained. Then, a position offset amount is obtained according to a result of comparing the real spatial relationship with a reference spatial relationship. If the position offset amount is larger than the enable calibration threshold value, a calibrated icon display start coordinate position is obtained according to the position offset amount. The present invention also provides a control device using the calibrating method.

19 Claims, 7 Drawing Sheets

METHOD FOR CALIBRATING FUNCTIONAL ICON DISPLAY POSITION AND CONTROL DEVICE USING THE METHOD

FIELD OF THE INVENTION

The present invention relates to an image information calibrating method and a control device using the method, and more particularly to a method for calibrating a functional icon display position of and a control device using the method.

BACKGROUND OF THE INVENTION

Nowadays, a control device with visual key structures has been introduced into the market. This control device comprises a display panel and plural light-transmissible key structures. Due to the cooperation of the display panel and the light-transmissible key structures, the user can execute the function of a button shortcut operation (or a macro command operation), or the user can self-define specific operation functions of various keys.

For example, in the field of live streaming applications, the control device with the visual key structures is suitable to cooperate with existing input devices. The visual key of the control device provides a function of displaying a functional icon for facilitating the user (e.g., the live streamer) to quickly make associated selection and operation in an intuitive manner. In addition, the control device allows the user to self-define the functions of various keys.

The components of the control device with the visual key structures will be described as follows.

Please refer to FIG. 1A and FIG. 1B. FIG. 1A is a schematic perspective view illustrating a conventional control device with visual key structures. FIG. 1B is a schematic exploded view illustrating the components of the control device as shown in FIG. 1A. As shown in FIG. 1A and FIG. 1B, the control device 10 at least comprises a covering member, plural transparent keys 131, an elastic membrane switch structure 132, a display panel 14 and a main control board 15. The covering member at least comprises an upper cover 11 and a lower cover 12, which are combined together. The plural transparent keys 131 are respectively penetrated through plural first openings 110 of the upper cover 11 and exposed outside. In addition, the plural transparent keys 131 are installed and attached on the elastic membrane switch structure 132. The display panel 14 is aligned with and located under the plural transparent keys 131 and the elastic membrane switch structure 132. The main control board 15 is electrically connected with the elastic membrane switch structure 132 and the display panel 14. The main control board 15 can generate plural functional icons to the display panel 14. Consequently, the plural functional icons are displayed on the display panel 14 and visible through the plural transparent keys 131.

The covering member further comprises an inner cover 111. The inner cover 111 is arranged between the upper cover 11 and the lower cover 12. As shown in FIG. 1B, the inner cover 111 is located beside the inner side of the upper cover 11. The inner cover 111 comprises plural second openings 1110 corresponding to the plural first openings 110 of the upper cover 11. Moreover, the plural transparent keys 131 are respectively penetrated through the corresponding second openings 1110 of the inner cover 111 and the corresponding first openings 110 of the upper cover 11 and exposed outside.

As shown in FIG. 1B, the upper cover 11 and the inner cover 111 are two individual components. Optionally, the inner cover may be omitted. Alternatively, the upper cover 11 and the inner cover 111 are integrated into a one-piece structure (e.g., an integrated top cover).

In an embodiment, an accommodation space 120 is defined by the upper cover 11 and the lower cover 12 collaboratively. In addition, the plural transparent keys 131, the elastic membrane switch structure 132, the display panel 14 and the main control board 15 are accommodated and disposed within the accommodation space 120.

Furthermore, the plural transparent keys 131 (e.g., 15 transparent keys 131) and the elastic membrane switch structure 132 are collaboratively combined as a transparent membrane key module. For example, the display panel 14 is an LCD display panel. The display panel 14 comprises an image pixel display region 141 and a panel body 142. The image pixel display region 141 is covered by the panel body 142.

Please refer to FIG. 2A. FIG. 2A schematically illustrates the concepts of displaying a specified functional icon I1 in a visible region 13111 of a specified transparent key 1311. The specified functional icon I1 is any one of the plural functional icons. For example, the specified functional icon I1 is an "@" icon. The specified transparent key 1311 is any one of the plural transparent keys 131. Due to the assembling factors, the border regions of the specified transparent key 1311 are not visible. That is, the specified functional icon I1 is visible through a visible region 13111 of the specified transparent key 1311 only.

Ideally, the specified functional icon I1 should be displayed at the geometric center position in the visible range 13111. However, as mentioned above, the control device 10 is composed of many components. During the assembling process of these components, some problems about the component tolerances and/or assembly tolerances occur. Consequently, the specified functional icon I1 under the specified transparent key 1311 is usually unable to be located at the ideal or the default display position. Under this circumstance, a serious quality control problem about the control device 10 usually occurs.

The quality control problem of the conventional control device will be described as follows with reference to FIG. 2B. FIG. 2B schematically illustrates a skewed situation of the display position of the specified functional icon I1 in the visible region 13111 of the specified transparent key 1311.

As shown in FIG. 2B, the point C1 is a default icon display start coordinate in the image pixel display region 141 of the display panel 14. From the icon display start coordinate C1, the x-coordinate value of the specified functional icon I1 increases to the right, and the y-coordinate value of the specified functional icon I1 increases downwards. Consequently, the image pixels of the specified functional icon I1 are sequentially outputted. In addition, the specified functional icon I1 has at least one image border I11 (e.g., four image borders I11), and the visible region 13111 of the specified transparent key 1311 has at least one visible region border (e.g., four visible region borders). The distance between the top image border I11 and the top visible region border is e11. The distance between the bottom image border I11 and the bottom visible region border is e12. The distance between the left image border I11 and the left visible region border is e13. The distance between the right image border I11 and the right visible region border is e14. Ideally, each of the four distances e11, e12, e13 and e14 is smaller than a threshold value. However, due to the component tolerances and/or assembly tolerances, at least one of the four distances is larger than the threshold value. In other words, the distance between a geometric center 110 of the specified functional icon I1 and a geometric center 13110 of the visible region 13111 is larger than the threshold value. Under this circumstance, the quality control problem of the conventional control device occurs.

In order to overcome the drawbacks of the conventional technologies, it is important to provide a method for calibrating a display position of the functional icon.

SUMMARY OF THE INVENTION

An object of the present invention provides a method for calibrating a functional icon display position and a control device using the method. An image capturing device is used to acquire the functional icon. Then, the display position of the functional icon is calibrated by the calibrating method.

In accordance with an aspect of the present invention, a method for calibrating a functional icon display position of a control device is provided. The control device includes a transparent key and a display panel. The method includes the following steps. Firstly, in a step (a), a functional icon is displayed according to an icon display start coordinate in the display panel and at a position corresponding to a visible region of the transparent key. The display panel is located under the transparent key. Then, in a step (b), an image capturing device is used to photograph the functional icon, and thus a real spatial relationship of the functional icon in the visible region is obtained. Then, in a step (c), a position offset amount is obtained according to a result of comparing the real spatial relationship with a reference spatial relationship. Then, a step (d) is performed to judge whether the position offset amount is larger than an enable calibration threshold value. If the position offset amount is smaller than or equal to the enable calibration threshold value, the method is ended. If the position offset amount is larger than the enable calibration threshold value, a step (e) is performed to obtain a calibrated icon display start coordinate position according to the position offset amount. Then, in a step (f), the functional icon is displayed according to the calibrated icon display start coordinate. Then, the step (b) is performed again.

In an embodiment, the control device at least includes an upper cover, an inner cover, the transparent key, an elastic membrane switch structure, the display panel, a main control board and a lower cover.

In an embodiment, the upper cover and the inner cover are two individual components, or the upper cover and the inner cover are integrated into an integrated top cover. Moreover, the transparent key and the elastic membrane switch structure are combined as a transparent membrane key module.

In an embodiment, the upper cover includes a first opening, the inner cover includes a second opening, the inner cover is located beside an inner side of the upper cover, and the second opening is aligned with the first opening. After the transparent key is penetrated through the second opening and the first opening sequentially, the transparent key is exposed outside.

In an embodiment, the display panel is an LCD display panel, and the display panel includes an image pixel display region and a panel body. The image pixel display region is covered by the panel body.

In an embodiment, the real spatial relationship is related to at least one real distance between at least one image border of the functional icon and at least one visible region border of the visible region.

In an embodiment, before the step (a), the method further includes steps (a1) and (a2). In the step (a1), a reference functional icon is displayed according to a reference icon display start coordinate in the display panel and at a position corresponding to the visible region of the transparent key. In the step (a2), the image capturing device is used to photograph the reference functional icon, and thus a reference spatial relationship of the reference functional icon in the visible region is obtained. The reference spatial relationship is related to at least one reference distance between at least one image border of the reference functional icon and the at least one visible region border of the visible region.

Preferably, in the step (c), the position offset amount is obtained according to a difference between the at least one real distance and the at least one reference distance.

In an embodiment, the real spatial relationship is related to a geometric center of the functional icon in the visible region, and the reference spatial relationship is related to a geometric center of the visible region.

Preferably, in the step (c), the position offset amount is obtained according to a difference between the geometric center of the functional icon and the geometric center of the visible region.

In accordance with another aspect of the present invention, a method for calibrating a functional icon display position of a control device is provided. The control device includes a transparent key and a display panel. The method includes the following steps. Firstly, in a step (a), a functional icon is displayed according to an icon display start coordinate in the display panel and at a position corresponding to a visible region of the transparent key. The display panel is located under the transparent key. Then, in a step (b), an image capturing device is used to photograph the functional icon, and thus at least one real distance between at least one image border of the functional icon and at least one visible region border of the visible region is obtained. Then, in a step (c), a position offset amount is obtained according to a result of comparing the at least one real distance with at least one reference distance. Then, a step (d) is performed to judge whether the position offset amount is larger than an enable calibration threshold value. If the position offset amount is smaller than or equal to the enable calibration than the enable calibration threshold value, a step (e) is performed to obtain a calibrated icon display start coordinate according to the position offset amount. Then, in a step (f), the functional icon is displayed according to the calibrated icon display start coordinate. Then, the step (b) is performed again.

In an embodiment, before the step (a), the method further includes steps (a1) and (a2). In the step (a1), a reference functional icon is displayed according to a reference icon display start coordinate in the display panel and at a position corresponding to the visible region of the transparent key. In the step (a2), the image capturing device is used to photograph the reference functional icon, and thus a reference spatial relationship of the reference functional icon in the visible region is obtained. The reference spatial relationship is related to at least one reference distance between at least one image border of the reference functional icon and the at least one visible region border of the visible region.

Preferably, the step (c), the position offset amount is obtained according to a difference between the at least one real distance and the at least one reference distance.

In accordance with another aspect of the present invention, a control device is provided. The control device includes an upper cover, a lower cover, a transparent key, an elastic membrane switch structure, a display panel and a main control board. The upper cover includes a first opening. The upper cover and the upper cover are combined together. Consequently, an accommodation space is defined by the upper cover and the lower cover. The transparent key is disposed within the accommodation space. A portion of the transparent key is penetrated through the first opening and exposed outside. The elastic membrane switch structure is disposed within the accommodation space. The elastic membrane switch structure is located beside and aligned with the transparent key. The display panel is disposed within the accommodation space. The display panel is located beside and located under the transparent key and the elastic membrane switch structure. The display panel includes an image pixel display region corresponding to the transparent key. A functional icon is displayed on the image pixel display region and visible through the transparent key. The main control board is disposed within the accommodation space, and electrically connected with the elastic membrane switch structure and the display panel. A display position of the functional icon is calibrated by a calibrating method. The calibrating method includes the following steps. Firstly, in a step (a), a functional icon is displayed according to an icon display start coordinate in the display panel and at a position corresponding to a visible region of the transparent key. Then, in a step (b), an image capturing device is used to photograph the functional icon, and thus at least one real distance between at least one image border of the functional icon and at least one visible region border of the visible region is obtained. Then, in a step (c), a position offset amount is obtained according to a result of comparing the at least one real distance with at least one reference distance. Then, a step (d) is performed to judge whether the position offset amount is larger than an enable calibration threshold value. If the position offset amount is smaller than or equal to the enable calibration threshold value, the method is ended. If the position offset amount is larger than the enable calibration threshold value, a step (e) is performed to obtain a calibrated icon display start coordinate according to the position offset amount. Then, in a step (f), the functional icon is displayed according to the calibrated icon display start coordinate. Then, the step (b) is performed again. In addition, a difference between the at least one real distance and the at least one reference distance is smaller than two image pixels.

In an embodiment, the difference between the at least one real distance and the at least one reference distance is smaller than one image pixel, wherein a width of one image pixel is about 0.198 mm.

In accordance with another aspect of the present invention, a method for calibrating a functional icon display position of a control device is provided. The control device includes a transparent key and a display panel. The method includes the following steps. Firstly, in a step (a), a functional icon is displayed according to an icon display start coordinate in the display panel and at a position corresponding to a visible region of the transparent key. The display panel is located under the transparent key. Then, in a step (b), an image capturing device to photograph the functional icon, and thus a geometric center of the functional icon in the visible region and a geometric center of the visible region are obtained. Then, in a step (c), a position offset amount is obtained according to a result of comparing the geometric center of the functional icon and the geometric center of the visible region. Then, a step (c) is performed to judge whether the position offset amount is larger than an enable calibration threshold value. If the position offset amount is smaller than or equal to the enable calibration threshold value, the method is ended. If the position offset amount is larger than the enable calibration threshold value, a step (e) is performed to obtain a calibrated icon display start coordinate according to the position offset amount. Then, in a step (f), the functional icon is displayed according to the calibrated icon display start coordinate. Then, the step (b) is performed again.

Preferably, in the step (c), the position offset amount is obtained according to a difference between the geometric center of the functional icon and the geometric center of the visible region.

In accordance with another aspect of the present invention, a control device is provided. The control device includes an upper cover, a lower cover, a transparent key, an elastic membrane switch structure, a display panel and a main control board. The upper cover includes a first opening. The upper cover and the upper cover are combined together. Consequently, an accommodation space is defined by the upper cover and the lower cover. The transparent key is disposed within the accommodation space. A portion of the transparent key is penetrated through the first opening and exposed outside. The elastic membrane switch structure is disposed within the accommodation space. The elastic membrane switch structure is located beside and aligned with the transparent key. The display panel is disposed within the accommodation space. The display panel is located beside and located under the transparent key and the elastic membrane switch structure. The display panel includes an image pixel display region corresponding to the transparent key. A functional icon is displayed on the image pixel display region and visible through the transparent key. The main control board is disposed within the accommodation space, and electrically connected with the elastic membrane switch structure and the display panel. A display position of the functional icon is calibrated by a calibrating method. The calibrating method includes the following steps. Firstly, in a step (a), a functional icon is displayed according to an icon display start coordinate in the display panel and at a position corresponding to a visible region of the transparent key. Then, in a step (b), an image capturing device to photograph the functional icon, and thus a geometric center of the functional icon in the visible region and a geometric center of the visible region are obtained. Then, in a step (c), a position offset amount is obtained according to a result of comparing the geometric center of the functional icon and the geometric center of the visible region. Then, a step (c) is performed to judge whether the position offset amount is larger than an enable calibration threshold value. If the position offset amount is smaller than or equal to the enable calibration than the enable calibration threshold value, a step (e) is performed to obtain a calibrated icon display start coordinate according to the position offset amount. Then, in a step (f), the functional icon is displayed according to the calibrated icon display start coordinate. Then, the step (b) is performed again. In addition, a difference between the geometric center of the functional icon and the geometric center of the visible region is smaller than two image pixels.

In an embodiment, the difference between the geometric center of the functional icon and the geometric center of the visible region is smaller than one image pixel, wherein a width of one image pixel is about 0.198 mm.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. In the following embodiments and drawings, the elements irrelevant to the concepts of the present invention are omitted and not shown.

Figure 3:
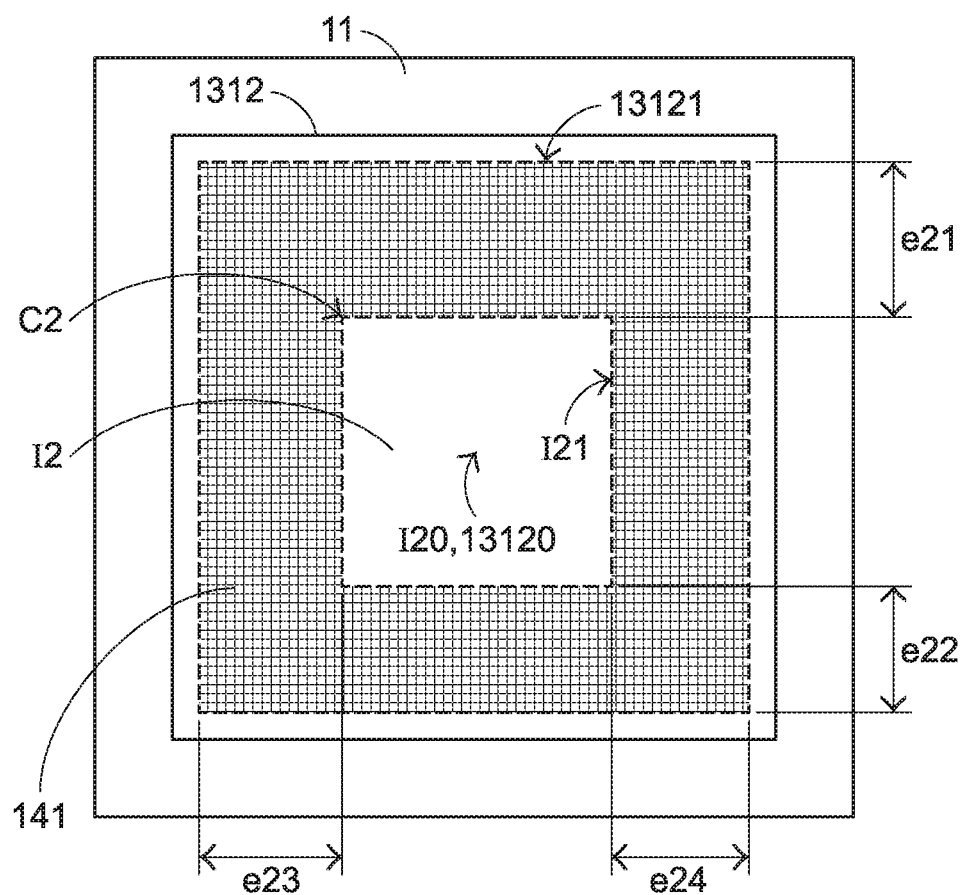
FIG. 3 schematically illustrates the concepts of displaying a reference functional icon in a visible region of a specified transparent key.

The present invention provides a method for calibrating a functional icon display position and a control device using the method. The calibrating method and the control device will be illustrated with reference to FIGS. 1A, 1B and 3. FIG. 3 schematically illustrates the concepts of displaying a reference functional icon 12 in a visible region 13121 of a transparent key 1312.

Figure 1A:
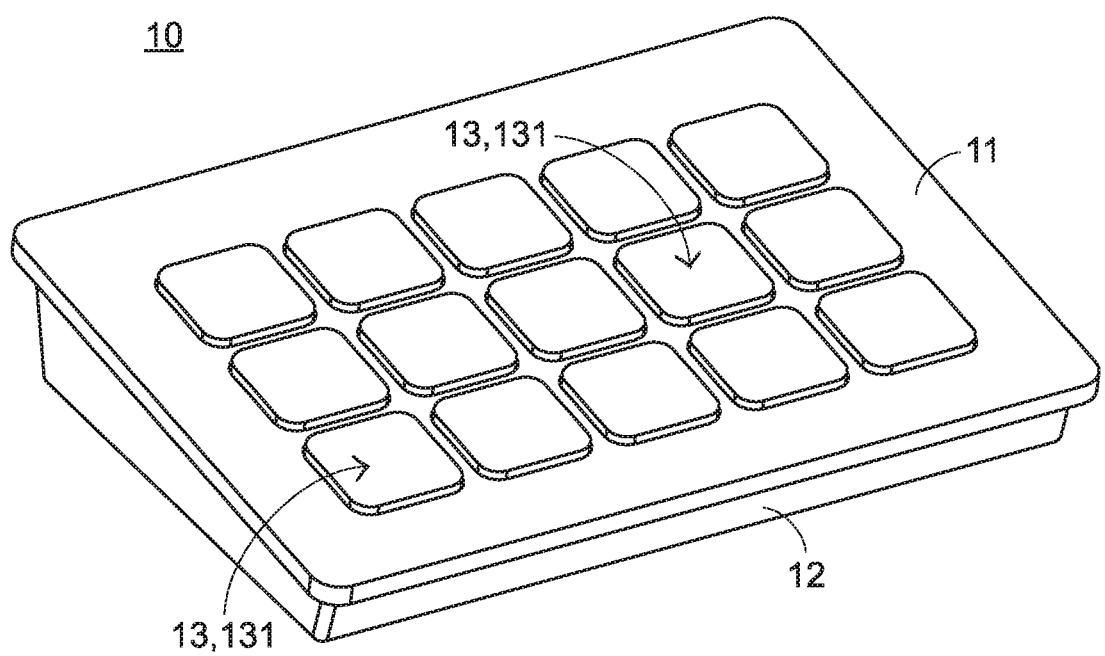
FIG. 1A is a schematic perspective view illustrating a conventional control device with visual key structures.
Figure 1B:
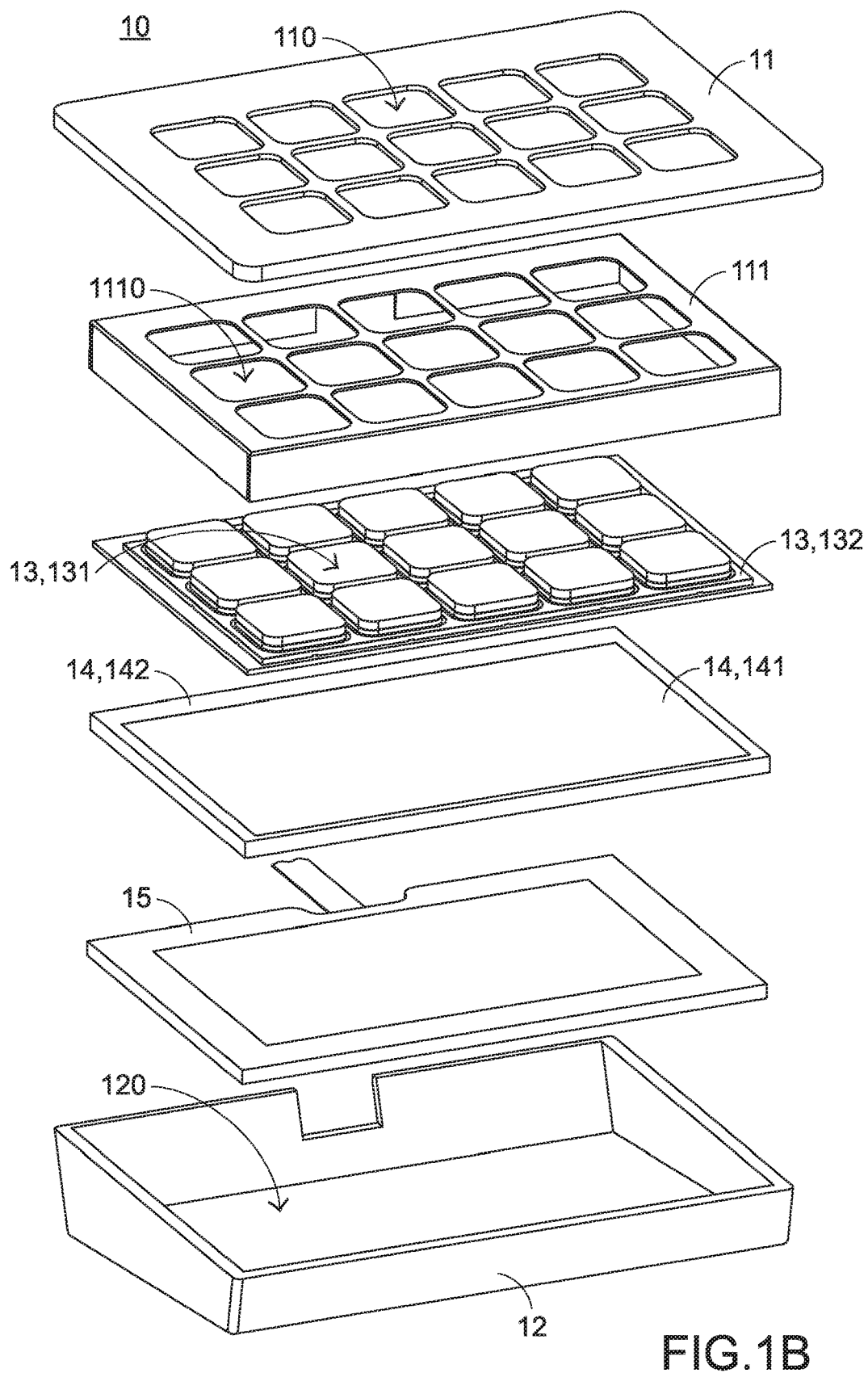
FIG. 1B is a schematic exploded view illustrating the components of the control device as shown in FIG. 1A.

For well understanding the concepts of the present invention, the reference functional icon 12 shown in FIG. 3 is a full white reference functional icon. In addition, the transparent key 1312 is any one of the plural transparent keys 131, which are shown in FIGS. 1A and 1B and exposed outside the upper cover 11.

As shown in FIG. 3, the point C2 is a default icon display start coordinate in the image pixel display region 141 of the display panel 14. From the icon display start coordinate C2, the x-coordinate value of the reference functional icon 12 increases to the right, and the y-coordinate value of the reference functional icon 12 increases downwards. Consequently, the image pixels of the reference functional icon 12 are sequentially outputted. The icon display start coordinate C2 is previously set according to the practical requirements. According to the icon display start coordinate C2, the reference functional icon 12 can be displayed at a correct display position (or an ideal display position).

In FIG. 3, plural small square grids are contained in the image pixel display region 141. These small square grids are used to indicate that the image pixel display region 141 is composed of plural image pixels.

Furthermore, the display position of the reference functional icon 12 is shown in FIG. 3. The reference functional icon 12 has at least one image border 121, e.g., four image borders 121, and the visible region 13121 of the transparent key 1312 has at least one visible region border, e.g., four visible region borders. The reference distance between the top image border 121 and the top visible region border is e21. The reference distance between the bottom image border 121 and the bottom visible region border is e21. The reference distance between the left image border 121 and the left visible region border is e23. The reference distance between the right image border 121 and the right visible region border is e24. In the subsequent display position calibrating process, the calibrating result can be determined according to the four reference distances e21, e22, e23 and e24. Furthermore, as shown in FIG. 3, a geometric center 120 of the reference functional icon 12 and a geometric center 13120 of the visible region 13121 are highly overlapped with each other. In other words, the calibrating result can be also determined according to the distance between the geometric center 120 of the reference functional icon 12 and the geometric center 13120 of the visible region 13121 in the subsequent display position calibrating process.

Figure 4A:
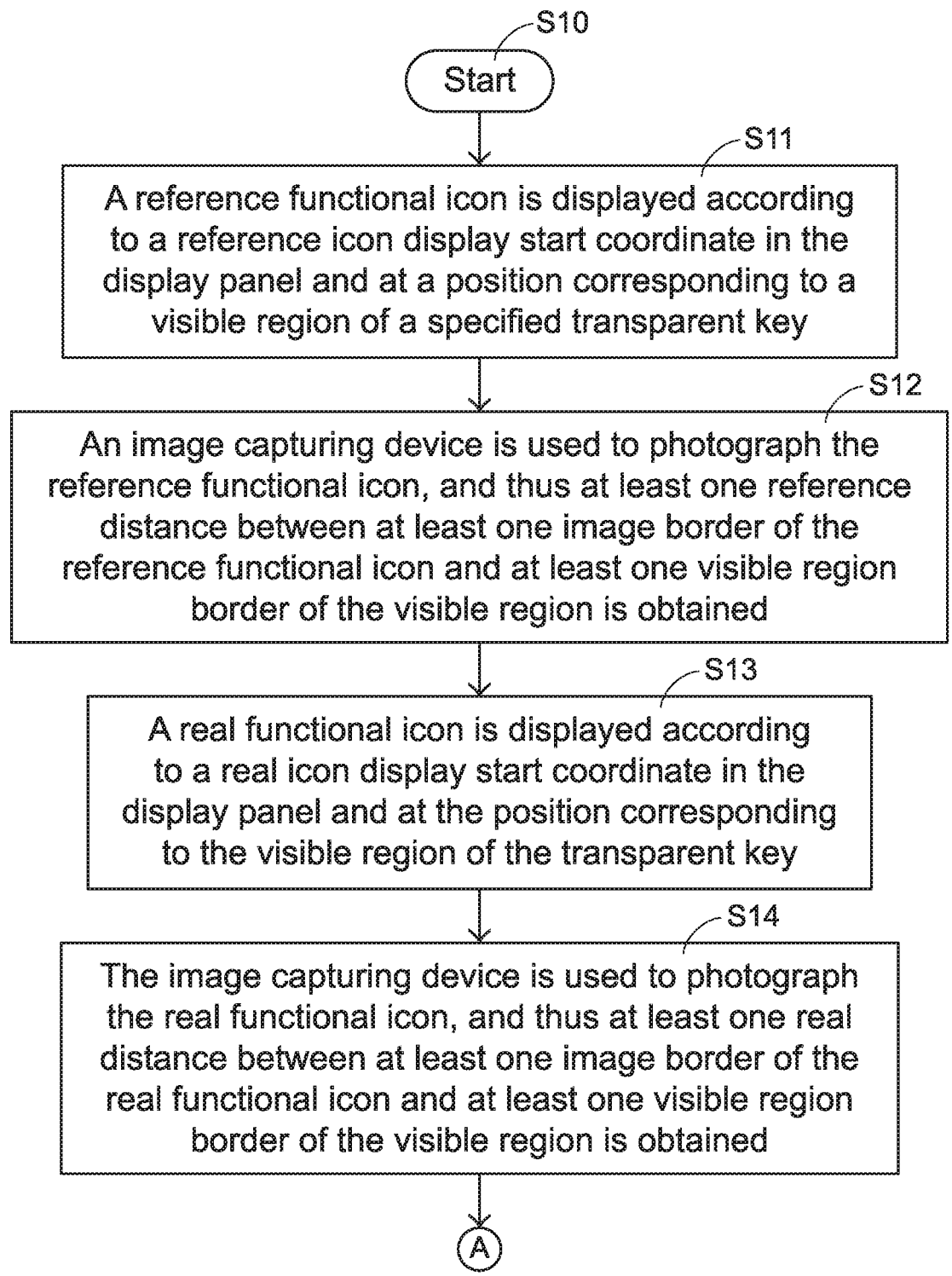
FIGS. 4A and 4B illustrate a flowchart of a method for calibrating a functional icon display position according to a first embodiment of the present invention.
Figure 4B:
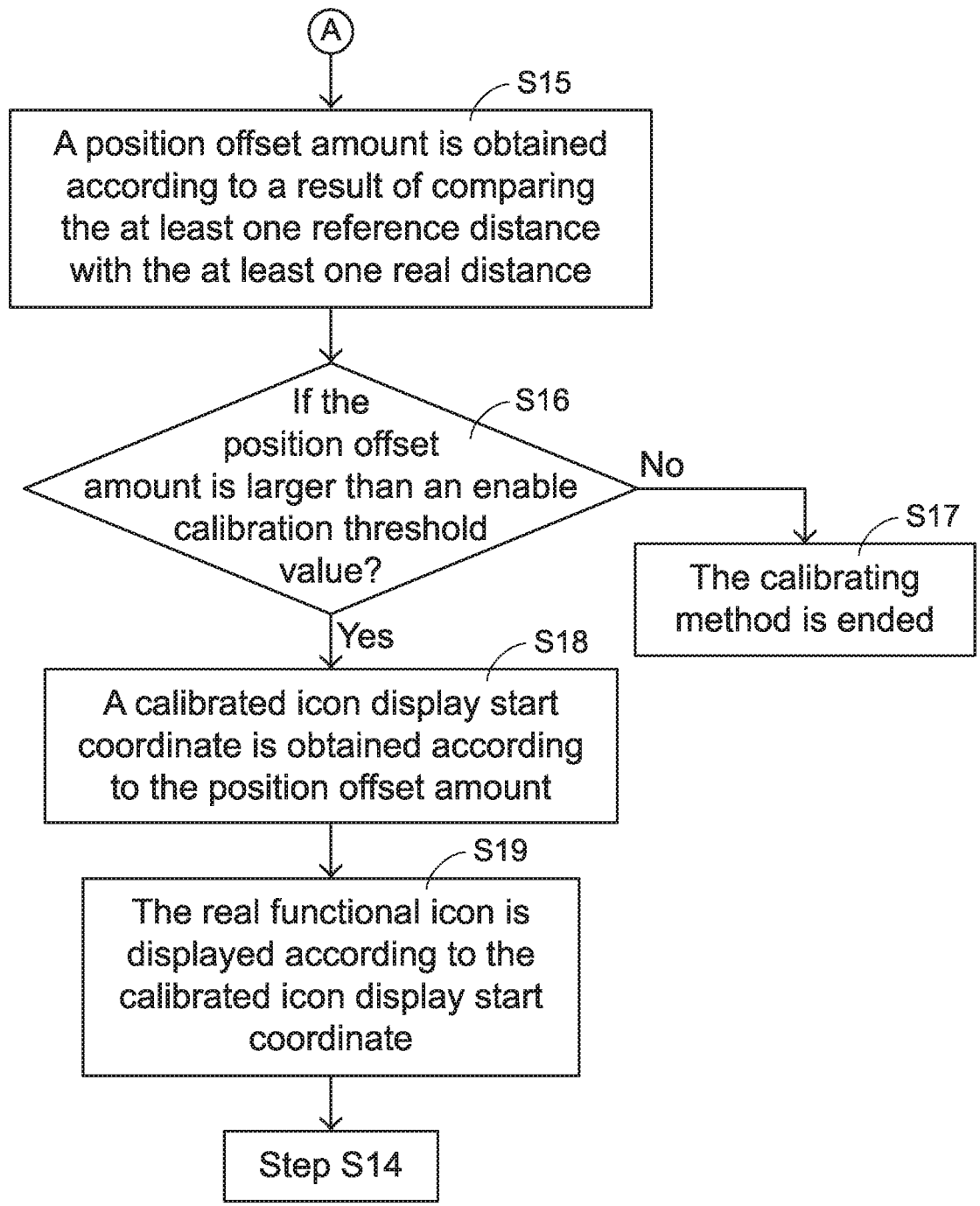

FIGS. 4A and 4B illustrate a flowchart of a method for calibrating a functional icon display position according to a first embodiment of the present invention. Please also refer to FIGS. 2A, 2B and 3. The calibrating method of the first embodiment at least comprises the following steps.

Firstly, in a step S10, the flowchart is started.

Then, in a step S11, a reference functional icon is displayed according to a reference icon display start coordinate in the display panel and at a position corresponding to a visible region of a transparent key. For example, as shown in FIG. 3, the reference functional icon 12 is displayed according to the reference icon display start coordinate C2 in the image pixel display region 141 of the display panel 14 and at a position corresponding to the visible region 13121 of the transparent key 1312.

Then, in a step S12, an image capturing device is used to photograph the reference functional icon, and thus at least one reference distance between at least one image border of the reference functional icon and at least one visible region border of the visible region is obtained. For example, as shown in FIG. 3, the reference functional icon 12 is photographed by the image capturing device (not shown). Consequently, four reference distances e21, e22, e23 and e24 between the four image borders 121 of the reference functional icon 12 and the corresponding visible region borders of the visible region 13121 are obtained.

Furthermore, each of the reference distances e21, e22, e23 and e24 may be regarded as a reference spatial relationship.

Figure 2A:
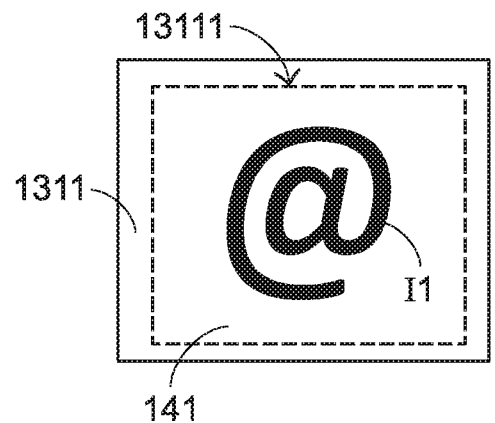
FIG. 2A schematically illustrates the concepts of displaying a specified functional icon in a visible region of a specified transparent key.
Figure 2B:
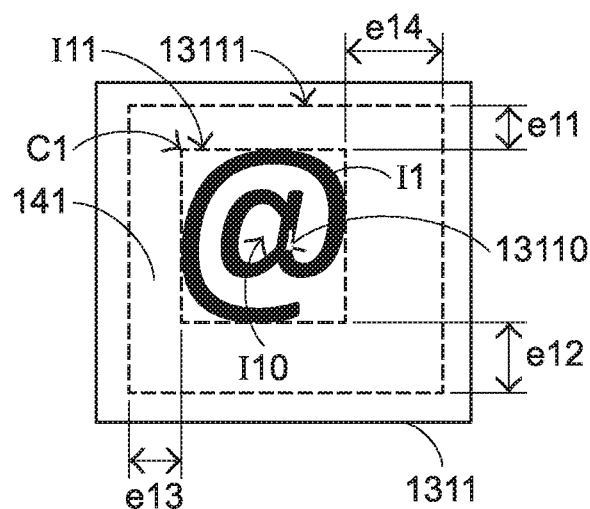
FIG. 2B schematically illustrates a skewed situation of the display position of the specified functional icon in the visible region of the specified transparent key.

Then, in a step S13, a real functional icon is displayed according to a real icon display start coordinate in the display panel and at the position corresponding to the visible region of the transparent key. For example, as shown in FIG. 2B, the real functional icon I1 is displayed according to the real icon display start coordinate C1 in the image pixel display region 141 of the display panel 14 and at the position corresponding to the visible region 13111 of the transparent key 1311.

Then, in a step S14, the image capturing device is used to photograph the real functional icon, and thus at least one real distance between at least one image border of the real functional icon and at least one visible region border of the visible region is obtained. For example, as shown in FIG. 2B, the real functional icon I1 is photographed by the image capturing device. Consequently, four real distances e11, e12, e13 and e14 between the four image borders I11 of the real functional icon I1 and the corresponding visible region borders of the visible region 13111 are obtained.

Furthermore, each of the real distances e11, e12, e13 and e14 may be regarded as a real spatial relationship.

Then, in a step S15, a position offset amount is obtained according to a result of comparing the at least one reference distance with the at least one real distance. As shown in FIG. 2B and FIG. 3, the reference spatial relationship (i.e., the reference distances e21, e22, e23 and e24) and the real spatial relationship (i.e., the real distances e11, e12, e13 and e14) are compared with each other. Consequently, four position offset amounts are obtained. In addition, any of the four position offset amounts may be selected for judgment in the subsequent step.

Then, a step S16 is performed to judge whether the position offset amount is larger than an enable calibration threshold value. In the situation as shown in FIG. 2B and FIG. 3, the step S16 is performed to judge whether the position offset amounts is larger than the enable calibration threshold value. For example, the enable calibration threshold value is smaller than 2 image pixels, and the width of one image pixel is about 0.198 mm. In an embodiment, the enable calibration threshold value is equal to one image pixel.

If the judging result of the step S16 indicates that the position offset amount is smaller than or equal to the enable calibration threshold value, the calibrating method is ended (Step S17).

If the judging result of the step S16 indicates that the position offset amount is larger than the enable calibration threshold value, a step S18 is performed. In the step S18, a calibrated icon display start coordinate is obtained according to the position offset amount.

Then, in a step S19, the real functional icon is displayed according to the calibrated icon display start coordinate. Then, the step S14 is performed again. For example, as shown in FIGS. 2A, 2B and 3, the real functional icon I1 is displayed again. The step S14 is repeatedly done until the situation of FIG. 2A is obtained. Consequently, the real functional icon I1 is adjusted to the ideal display position in the visible region 13111 of the transparent key 1311.

Figure 5:
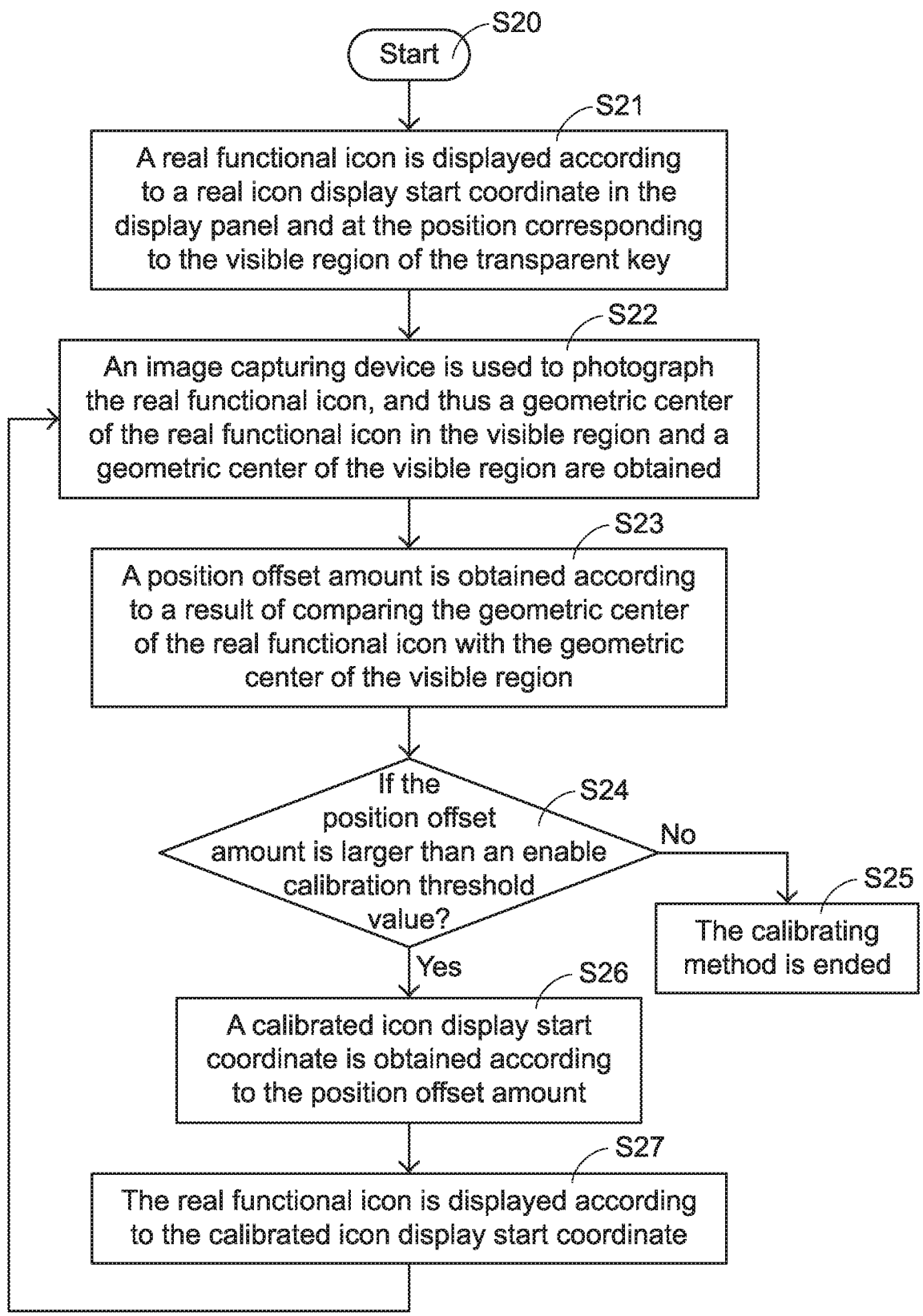
FIG. 5 illustrates a flowchart of a method for calibrating a functional icon display position according to a second embodiment of the present invention.

It is noted that numerous modifications and alterations of the calibrating method may be modified while retaining the teachings of the present invention. FIG. 5 illustrates a flowchart of a method for calibrating a functional icon display position according to a second embodiment of the present invention. Please also refer to FIGS. 2A and 2B. The calibrating method of the second embodiment at least comprises the following steps.

Firstly, in a step S20, the flowchart is started.

Then, in a step S21, a real functional icon is displayed according to a real icon display start coordinate in the display panel and at the position corresponding to the visible region of the transparent key. For example, as shown in FIG. 2B, the real functional icon I1 is displayed according to the real icon display start coordinate C1 in the image pixel display region 141 of the display panel 14 and at the position corresponding to the visible region 13111 of the transparent key 1311.

Then, in a step S22, an image capturing device is used to photograph the real functional icon, and thus a geometric center of the real functional icon in the visible region and a geometric center of the visible region are obtained. For example, as shown in FIG. 2B, the real functional icon I1 is photographed by the image capturing device. Consequently, a geometric center 110 of the real functional icon I1 in the visible region 13111 and a geometric center 13110 of the visible region 13111 are obtained.

Furthermore, the geometric center 110 of the real functional icon I1 may be obtained according to a real spatial relationship between the four image borders I11 of the real functional icon I1, and the geometric center 13110 of the visible region 13111 may be obtained according a reference spatial relationship between the four visible region borders of the visible region 13111.

Then, in a step S23, a position offset amount is obtained according to a result of comparing the geometric center of the real functional icon with the geometric center of the visible region. As shown in FIG. 2B, the real spatial relationship (i.e., the geometric center 110 of the real functional icon I1) and the reference spatial relationship (i.e., the geometric center 13110 of the visible region 13111) are compared with each other. Consequently, the position offset amount is obtained.

Then, a step S24 is performed to judge whether the position offset amount is larger than an enable calibration threshold value. In the situation as shown in FIG. 2B, the step S24 is performed to judge whether the position offset amounts is larger than the enable calibration threshold value. For example, the enable calibration threshold value is smaller than 2 image pixels, and the width of one image pixel is about 0.198 mm. In an embodiment, the enable calibration threshold value is equal to one image pixel.

If the judging result of the step S24 indicates that the position offset amount is smaller than or equal to the enable calibration threshold value, the calibrating method is ended (Step S25).

If the judging result of the step S24 indicates that the position offset amount is larger than the enable calibration threshold value, a step S26 is performed. In the step S26, a calibrated icon display start coordinate is obtained according to the position offset amount.

Then, in a step S27, the real functional icon is displayed according to the calibrated icon display start coordinate. Then, the step S22 is performed again. For example, as shown in FIGS. 2A and 2B, the real functional icon I1 is displayed again. The step S22 is repeatedly done until the situation of FIG. 2A is obtained. Consequently, the real functional icon I1 is adjusted to the ideal display position in the visible region 13111 of the transparent key 1311.

The present invention further provides a control device using the calibrating method. For example, the calibrating method in each of the above embodiments can be applied to the control device 10 as shown in FIGS. 1A and 1B. In the control device, at least one real distance between at least one image border of the real functional icon and at least one visible region border of the visible region are obtained, or the geometric center of the real functional icon and the geometric center of the visible region are obtained. The position offset amount between the at least one real distance and the at least one visible region border is smaller than 1~2 image pixels. Similarly, the position offset amount between the geometric center of the real functional icon and the geometric center of the visible region is smaller than 1~2 image pixels.

The calibrating methods of the above embodiments may be individually performed or collaboratively performed. Consequently, the quality control problem of the control device can be effectively overcome. In other words, the technologies of the present invention are industrially valuable.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A method for calibrating a functional icon display position of a control device, the control device comprising a transparent key and a display panel, the method comprising steps of:
   (a) displaying a functional icon according to an icon display start coordinate in the display panel and at a position corresponding to a visible region of the transparent key, wherein the display panel is located under the transparent key;
   (b) using an image capturing device to photograph the functional icon, so that a real spatial relationship of the functional icon in the visible region is obtained;
   (c) obtaining a position offset amount according to a result of comparing the real spatial relationship with a reference spatial relationship;
   (d) judging whether the position offset amount is larger than an enable calibration threshold value, wherein if the position offset amount is smaller than or equal to the enable calibration threshold value, the method is ended;
   (e) if the position offset amount is larger than the enable calibration threshold value, obtaining a calibrated icon display start coordinate position according to the position offset amount; and
   (f) displaying the functional icon according to the calibrated icon display start coordinate, and performing the step (b) again.

2. The method according to claim 1, wherein the control device at least comprises an upper cover, an inner cover, the transparent key, an elastic membrane switch structure, the display panel, a main control board and a lower cover.

3. The method according to claim 2, wherein the upper cover and the inner cover are two individual components, or the upper cover and the inner cover are integrated into an integrated top cover, wherein the transparent key and the elastic membrane switch structure are combined as a transparent membrane key module.

4. The method according to claim 2, wherein the upper cover comprises a first opening, the inner cover comprises a second opening, the inner cover is located beside an inner side of the upper cover, and the second opening is aligned with the first opening, wherein after the transparent key is penetrated through the second opening and the first opening sequentially, the transparent key is exposed outside.

5. The method according to claim 1, wherein the display panel is an LCD display panel, and the display panel comprises an image pixel display region and a panel body, wherein the image pixel display region is covered by the panel body.

6. The method according to claim 1, wherein the real spatial relationship is related to at least one real distance between at least one image border of the functional icon and at least one visible region border of the visible region.

7. The method according to claim 6, wherein before the step (a), the method further comprises steps of:
   (a1) displaying a reference functional icon according to a reference icon display start coordinate in the display panel and at a position corresponding to the visible region of the transparent key; and
   (a2) using the image capturing device to photograph the reference functional icon, so that a reference spatial relationship of the reference functional icon in the visible region is obtained,
   wherein the reference spatial relationship is related to at least one reference distance between at least one image border of the reference functional icon and the at least one visible region border of the visible region.

8. The method according to claim 7, wherein in the step (c), the position offset amount is obtained according to a difference between the at least one real distance and the at least one reference distance.

9. The method according to claim 1, wherein the real spatial relationship is related to a geometric center of the functional icon in the visible region, and the reference spatial relationship is related to a geometric center of the visible region.

10. The method according to claim 9, wherein in the step (c), the position offset amount is obtained according to a difference between the geometric center of the functional icon and the geometric center of the visible region.

11. A method for calibrating a functional icon display position of a control device, the control device comprising a transparent key and a display panel, the method comprising steps of:
   (a) displaying a functional icon according to an icon display start coordinate in the display panel and at a position corresponding to a visible region of the transparent key, wherein the display panel is located under the transparent key;
   (b) using an image capturing device to photograph the functional icon, so that at least one real distance between at least one image border of the functional icon and at least one visible region border of the visible region is obtained;
   (c) obtaining a position offset amount according to a result of comparing the at least one real distance with at least one reference distance;
   (d) judging whether the position offset amount is larger than an enable calibration threshold value, wherein if the position offset amount is smaller than or equal to the enable calibration threshold value, the method is ended;
   (e) if the position offset amount is larger than the enable calibration threshold value, obtaining a calibrated icon display start coordinate according to the position offset amount; and
   (f) displaying the functional icon according to the calibrated icon display start coordinate, and performing the step (b) again.

12. The method according to claim 11, wherein before the step (a), the method further comprises steps of:
   (a1) displaying a reference functional icon according to a reference icon display start coordinate in the display panel and at a position corresponding to the visible region of the transparent key; and
   (a2) using the image capturing device to photograph the reference functional icon, so that the at least one reference distance between at least one image border of the reference functional icon and the at least one visible region border of the visible region is obtained.

13. The method according to claim 12, wherein in the step (c), the position offset amount is obtained according to a difference between the at least one real distance and the at least one reference distance.

14. A control device, comprising:
   an upper cover comprising a first opening;
   a lower cover, wherein the upper cover and the upper cover are combined together, so that an accommodation space is defined by the upper cover and the lower cover;
   a transparent key disposed within the accommodation space, wherein a portion of the transparent key is penetrated through the first opening and exposed outside;

an elastic membrane switch structure disposed within the accommodation space, wherein the elastic membrane switch structure is located beside and aligned with the transparent key;

a display panel disposed within the accommodation space, wherein the display panel is located beside and located under the transparent key and the elastic membrane switch structure, the display panel comprises an image pixel display region corresponding to the transparent key, and a functional icon is displayed on the image pixel display region and visible through the transparent key; and a main control board disposed within the accommodation space, and electrically connected with the elastic membrane switch structure and the display panel, wherein a display position of the functional icon is calibrated by a calibrating method, and the calibrating method comprises steps of:

(a) displaying the functional icon according to an icon display start coordinate in the display panel and at a position corresponding to a visible region of the transparent key;

(b) using an image capturing device to photograph the functional icon, so that at least one real distance between at least one image border of the functional icon and at least one visible region border of the visible region is obtained;

(c) obtaining a position offset amount according to a result of comparing the at least one real distance with at least one reference distance;

(d) judging whether the position offset amount is larger than an enable calibration threshold value, wherein if the position offset amount is smaller than or equal to the enable calibration threshold value, the method is ended;

(e) if the position offset amount is larger than the enable calibration threshold value, obtaining a calibrated icon display start coordinate according to the position offset amount; and (f) displaying the functional icon according to the calibrated icon display start coordinate, and performing the step (b) again, wherein a difference between the at least one real distance and the at least one reference distance is smaller than two image pixels.

15. The control device according to claim 14, wherein the difference between the at least one real distance and the at least one reference distance is smaller than one image pixel, wherein a width of one image pixel is about 0.198 mm.

16. A method for calibrating a functional icon display position of a control device, the control device comprising a transparent key and a display panel, the method comprising steps of:

(a) displaying a functional icon according to an icon display start coordinate in the display panel and at a position corresponding to a visible region of the transparent key, wherein the display panel is located under the transparent key;

(b) using an image capturing device to photograph the functional icon, so that a geometric center of the functional icon in the visible region and a geometric center of the visible region are obtained;

(c) obtaining a position offset amount according to a result of comparing the geometric center of the functional icon and the geometric center of the visible region;

(d) judging whether the position offset amount is larger than an enable calibration threshold value, wherein if the position offset amount is smaller than or equal to the enable calibration threshold value, the method is ended;

(e) if the position offset amount is larger than the enable calibration threshold value, obtaining a calibrated icon display start coordinate according to the position offset amount; and (f) displaying the functional icon according to the calibrated icon display start coordinate, and performing the step (b) again.

17. The method according to claim 16, wherein in the step (c), the position offset amount is obtained according to a difference between the geometric center of the functional icon and the geometric center of the visible region.

18. A control device, comprising:

an upper cover comprising a first opening;

a lower cover, wherein the upper cover and the upper cover are combined together, so that an accommodation space is defined by the upper cover and the lower cover;

a transparent key disposed within the accommodation space, wherein a portion of the transparent key is penetrated through the first opening and exposed outside;

an elastic membrane switch structure disposed within the accommodation space, wherein the elastic membrane switch structure is located beside and aligned with the transparent key;

a display panel disposed within the accommodation space, wherein the display panel is located beside and located under the transparent key and the elastic membrane switch structure, the display panel comprises an image pixel display region corresponding to the transparent key, and a functional icon is displayed on the image pixel display region and visible through the transparent key; and a main control board disposed within the accommodation space, and electrically connected with the elastic membrane switch structure and the display panel, wherein a display position of the functional icon is calibrated by a calibrating method, and the calibrating method comprises steps of:

(a) displaying the functional icon according to an icon display start coordinate in the display panel and at a position corresponding to a visible region of the transparent key;

(b) using an image capturing device to photograph the functional icon, so that a geometric center of the functional icon in the visible region and a geometric center of the visible region are obtained;

(c) obtaining a position offset amount according to a result of comparing the geometric center of the functional icon and the geometric center of the visible region;

(d) judging whether the position offset amount is larger than an enable calibration threshold value, wherein if the position offset amount is smaller than or equal to the enable calibration threshold value, the method is ended;

(e) if the position offset amount is larger than the enable calibration threshold value, obtaining a calibrated icon display start coordinate according to the position offset amount; and (f) displaying the functional icon according to the calibrated icon display start coordinate, and performing the step (b) again, wherein a difference between the geometric center of the functional icon and the geometric center of the visible region is smaller than two image pixels.

19. The control device according to claim 18, wherein the difference between the geometric center of the functional icon and the geometric center of the visible region is smaller than one image pixel, wherein a width of one image pixel is about 0.198 mm.

* * * * *